United States Patent Office 3,660,306
Patented May 2, 1972

3,660,306
PROCESS FOR REGENERATING A DEHALOGENATION CATALYST
Kurt Sennewald, Hermulheim, near Cologne, Alexander Ohorodnik, Liblar, Joachim Hundeck, Knapsack, near Cologne, Werner Mittler, Hermulheim, near Cologne, Hermann Vierling, Hurth, near Cologne, and Wolfgang Opitz, Knapsack, near Cologne, Germany, assignors to Knapsack Aktiengesellschaft, Knapsack, near Cologne, Germany
No Drawing. Filed Apr. 20, 1970, Ser. No. 30,334
Claims priority, application Germany, Apr. 24, 1969,
P 19 20 806.1
Int. Cl. B01j 11/18, 11/02
U.S. Cl. 252—415          5 Claims

ABSTRACT OF THE DISCLOSURE

A catalyst containing metallic palladium deposited on an acidproof carrier for use in the hydrogenation and dechlorination of dichloroacetic acid and/or trichloroacetic acid to produce monochloroacetic acid and/or acetic is regenerated. To this effect, the poisoned catalyst containing moisture in form of water and/or acetic acid and/or monochloroacetic acid is treated with chlorine gas in an acid medium, at temperatures of between 20 and 200° C., whereby the metallic palladium is oxidized to palladium chloride; residual chlorine is expelled by means of an inert gas; and the oxidized catalyst is successively treated with a reducing agent to re-effect reduction of the palladium chloride to metallic palladium.

---

The present invention relates to a process for regenerating a dehalogenation catalyst.

It has already been reported that commercial monochloroacetic acid containing some percent dichloroacetic acid and minor proportions of trichloroacetic acid as ontaminants can be purified by subjecting the dichloroacetic acid and trichloroacetic acid to selective dechloroination by means of hydrogen in contact with metallic palladium, which is used in a concentration of between 0.1 and 10 weight percent and deposited on various carriers, such as silicic acid, active carbon, aluminum oxide, asbestos, or pumice, for example. The dechlorination reaction can be carried out with the use of a solid bed catalyst by supplying the crude acid mixture to be purified near the head of a solid bed reactor and conveying the hydrogen countercurrently therethrough, at temperatures of between 100 and 170° C., or by saturating the hydrogen consistently with the temperature specified above with vaporous matter evolved from the mixture of monochloroacetic acid and dichloroacetic acid, and then flowing the hydrogen/chloroacetic acid mixture over the solid bed catalyst. The hydrogenation and dechlorination can also be effected by suspending a very fine particulate catalyst in the crude acid and passing hydrogen through the suspension, at temperatures of between 100 and 150° C. The reaction can be carried out batchwise or, and this is preferred in industry, continuously by the continuous addition of feed material coupled with the continuous removal of purified product.

In U.S. Pat. 2,863,917, these catalysts have been described to soon lose their activity during the dechlorination of dichloroacetic acid and trichloroacetic acid with the use of hydrogen. As reported in Examples 9 through 17 of that patent, the activity of the catalyst drops down to about 75 percent of its initial value, after as short an operation period as 30 hours and less. To regenerate the catalyst, it is suggested in the above U.S. patent that the inactivated catalys be water-washed, dried at 200° C. and heated then to redness, in a nitrogen atmosphere. This type of regeneration, which has been experienced to be applicable only to catalysts deposited on an active carbon carrier, but not to catalysts deposited on an oxide-based carrier, e.g. $SiO_2$, has been found to affect the selectivity, i.e. to effect the dechlorination of increasing quantities of monochloroacetic acid to acetic acid. Palladium catalysts deposited on further carriers, e.g. silicic acid, have been found to behave similarly. The service life of the catalysts is a function of the type and nature of contaminants, of which varying proportions may be present in the feed material used for making monochloroacetic acid.

In view of the very costly catalysts, it is of outstanding commercial interest to have a simple process for regenerating catalysts rendered inactive by poisoning phenomena, which cannot be excluded.

The present invention provides more particularly a process for regenerating a catalyst for use in the hydrogenation and dechlorination of dichloroacetic acid and/or trichloroacetic acid to produce monochloroacetic acid and/ or acetic acid, the catalyst containing metallic palladium deposited on an acidproof carrier, which process comprises subjecting the poisoned catalyst containing moisture in form of water and/or acetic acid and/or monochloroacetic acid to treatment with chlorine gas in an acid medium, at temperatures of between 20 and 200° C., preferably between 100 and 150° C., whereby the metallic palladium is oxidized to palladium chloride; expelling residual chlorine by means of an inert gas; and successively treating the oxidized catalyst with a reducing agent to re-effect reduction of the palladium chloride to metallic palladium.

The catalyst to be regenerated may be washed with water and/or acetic acid and/or monochloroacetic acid, prior to chlorinating it. Prior to the treatment with chlorine, it may be advantageous to partially dry the catalyst to be regenerated so as to establish a moisture content of between 0.5 and 20 weight percent water therein, based on the weight of the moist catalyst. It is also possible, prior to the chlorine treatment, to partially dry the catalyst to undergo regeneration so as to estabilsh a moisture content of between 0.5 and 50 weight percent, preferably between 8 and 15 weight percent, acetic acid and/or monochloroacetic acid therein, based on the weight of the moist catalyst. Still further, it may be advantageous to use the chlorine gas in combination with 1 to 50 weight percent, preferably 5 to 10 weight percent, of a volatile acid, which advantageously is a hydrohalic acid, acetic acid or monochloroacetic acid. The useful reducing agents include, for example, hydrogen, hydrazine hydrate, alkali metal formate/formic acid, sodium boronate or hydroquinone.

Tow different causes substantially effect the catalyst poisoning or inactivation, namely a chemical and a physical change affecting the palladium surface, the chemical change being substantially more important.

The catalyst carriers primarily include materials having an inner surface of between 20 and 500 square meters per gram. These catalysts accordingly have a small pore diameter in the order of between 20 and 200 A. Depending on the particular type of impregnation, the metallic palladium may occupy a surface area on the carrier of between 0.1 and 3 square meters per gram palladium. In practice, the palladium surface is hardly subject to physical change occasioned, for example, by obstruction of the pores. The reason for this firstly resides in the fact that the contaminants in monochloroacetic acid hydrogenation in contact with a palladium catalyst practically fail to produce secondary products that tend to polymerize or polycondense, and secondly in the fact that substances of higher molecular weight, which may have been formed, are continuously washed away, particularly when the hydrogenation occurs in liquid phase. Extraction tests carried out with various solvents have shown firstly that inactivated catalysts are almost free from extractible substances, and secondly that this step does merely slightly improve the activity of inactivated catalysts. Heavy metal salts, which are definitely required to be eliminated from the reaction mixture, are capable of so contaminating the catalyst surface both by the deposition of insoluble salts and metallic deposits that the catalyst ceases to be active. The salts can be extracted with water, especially at elevated temperatures, but poisoning phenomena occasioned by the deposition of metal or chemical poisoning cannot be nullified by physical purification methods. A catalyst, which is free from adhering contaminants, can, however, be fully regenerated by subjecting it in accordance with the present invention to treatment with the chlorine oxidant, at temperatures of between 20 and 200° C. To this effect, it is most convenient to first free the catalyst from contaminants which mechanically adhere thereto, by treatment with water or a further solvent, for example acetic acid or monochloroacetic acid. Following this, the solvent is expelled at elevated temperature either under reduced pressure or by blowing an inert gas therethrough. The preliminary purification of the catalyst by washing it with water, acetic acid or a further solvent is unnecessary in those cases in which the catalyst was used for effecting the dechlorination in liquid phase, because it then naturally fails to have extractible contaminants therein. A residual moisture content of between 1 and 20 percent water (upon drying a $Pd/SiO_2$-catalyst, it is found, for example, that a water content of 10 percent establishes at 100° C., of 1 percent at 200° C. and of <0.1 percent at 300° C. drying temperature) does not affect the successive treatment of the catalyst with chlorine. Higher water contents are undesirable as they may well effect the dissolution and irregular distribution of $PdCl_2$, which culminates in a reduction of the active palladium surface. The catalyst so pretreated is successively chlorine-treated, without cooling it. At least 1 mol chlorine is required to be used per gram atom palladium. The reaction between the metallic palladium and chlorine occurs rather reluctantly, even in the presence of water. Unexpectedly, however, it has been found that the reaction velocity can be considerably increased by using the chlorine in admixture with a volatile acid, for example, hydrochloric acid, acetic acid or a similar acid. As metallic palladium is known to possibly contain very large portions of dissolved hydrogen, it is logical that the treatment of spent, hydrogen-saturated catalysts with chlorine at elevated temperatures, entails spontaneous reduction of palladium chloride, which has already been formed, to metallic palladium, i.e. the color change from black (metal) to orange (palladium chloride) is initially impossible to notice. The thicker the palladium layer, i.e. the smaller the surface area of the metallic palladium in the catalyst, the longer is the time needed to effect oxidation of the metallic palladium to palladium chloride. The oxidation of palladium by means of chlorine occurs, however, spontaneously provided that the chlorine is used in combination with a small proportion of hydrogen chloride, and the carrier contains between 0.5 and 20 percent residual moisture in form of water, acetic acid or monochloroacetic acid. Following the oxidation, the chlorine in excess is expelled by means of an inert gas ($N_2$) and the $PdCl_2$ on the carrier is reduced. The palladium chloride can be reduced both in gas phase with hydrogen and in liquid phase with, for example, hydrazine hydrate, alkali metal formate/formic acid, sodium boronate or hydroquinone.

The reduction of the $PdCl_2$-containing catalyst to metallic palladium can be effected in liquid phase, for example, by either introducing the dry catalyst into a 3 to 5 percent aqueous hydrazine hydrate solution, at temperatures around 50° C., or by causing the said solution to trickle over the stationary catalyst in the hydration reactor, again at temperatures around 50° C. The reduction occurs spontaneously in the two cases, and it can be further promoted by the addition of sodium hydroxide to the hydrazine solution. After about 15 to 30 minutes, the catalyst is isolated in known manner (suction filtration, decantation or dropping off) from the liquid phase and can then be used for the dehalogenation of dichloroacetic acid to monochloroacetic acid.

On reducing the $PdCl_2$ contained in the catalyst to metallic palladium by means of a gaseous reductant, such as hydrogen, the reaction occurs on heating the catalyst to a temperature of between 100 and 200° C., in the presence of the reductant (hydrogen). The reaction period is about 1 hour at a temperature of between 120 and 150° C. The catalyst so treated can successively be used for the dehalogenation of dichloroacetic acid to monochloroacetic acid.

EXAMPLE 1

A solid bed catalyst consisting of a silicic acid carrier (particles with a diameter of 5 mm.) containing 0.5 weight percent Pd, whose activity in the partial dechlorination of dichloroacetic acid in liquid phase had dropped to less than 20 percent of its initial activity, was first water-washed and dried then with nitrogen at a temperature of between 100 and 150° C. so as to leave a residual moisture content of less than 10 weight percent water therein. Following this, the catalyst was chlorine-treated at the same temperature. After 30 minutes, the palladium still failed to show distinct signs of oxidation; the addition of some percent hydrogen chloride to the chlorine initiated, however, an immediately visible reaction. The chlorine was expelled and the palladium chloride successively reduced. The reduction can be carried out in conventional manner with the use of either hydrogen or hydrazine, formate or a similar substance. The catalyst so regenerated was successively used for the selective dechlorination of dichloroacetic acid in liquid monochloroacetic acid and was found to have regained its full activity and selectivity.

EXAMPLE 2

An inactivated solid bed catalyst of the same quality as that used in Example 1 was washed with acetic acid, which was substituted for the water, dried at 100 to 150° C. and successively chlorine-treated. In clear contrast with the water-washed catalyst of Example 1, the oxidation occurred almost instantaneously in the present example, even in the absence of hydrogen chloride (acid medium)! The resulting palladium chloride had a yellowish grey coloration. The oxidized catalyst was reduced partly with hydrogen and partly with hydrazine. Both the hydrogen-reduced and the hydrazine-reduced catalyst portions were found to have regained their initial activity and selectivity.

EXAMPLE 3

A solid bed catalyst consisting of compressed silicic acid particles having a diameter of 5 mm. and containing 0.5 percent palladium, whose activity in the dehalogenation of dichloroacetic acid in liquid monochloroacetic acid (liquid phase) had dropped after a prolonged operation period to about 20 percent of its initial activity, was placed (without prior washing) in a cylindrical vessel 10 cm. wide and 2 meters long, arranged in upright position and provided with a heating means. Nitrogen was caused to flow downwardly through the cylindrical vessel at about 150° C. over a period of 30 minutes to substantially dry the catalyst. Following this, the catalyst was found to be still moist, namely with 1 percent acetic acid and 4 percent monochloroacetic acid. After the supply of nitrogen had been arrested, a mixture of chlorine and 10 weight percent hydrogen chloride was so introduced into the bottom portion of the column that the surface separating the chlorine from the nitrogen was displaced upwardly at a rate of between 0.1 and 1 mm. per second. Under these conditions, the palladium underwent spontaneous oxidation with the evolution of considerable heat. As soon as the chlorine/nitrogen separation layer was found to have traversed the catalyst column, the addition of chlorine was arrested, chlorine in excess was expelled from the reaction zone by scavenging it with nitrogen flowing downwardly therethrough, and the palladium chloride was reduced by means of hydrogen. The catalyst so regenerated was tested and found to have regained its inital selectivity and almost the full activity of a fresh catalyst.

EXAMPLE 4

A flow bed (fluidized bed) catalyst consisting of silicic acid particles having a diameter of between 0.05 and 0.1 mm. and containing 1.5 weight percent Pd, whose activity in the dehalogenation of dichloroacetic acid in liquid monochloroacetic acid (liquid phase) had dropped after a prolonged operation period down to about 25 percent of its initial activity, was introduced into the apparatus described in Example 3. The catalyst was dried under reduced pressure (10 mm. mercury) and by gradually increasing the temperature up to 150° C. The drying occurred very homogeneously in the case of the fluidized bed catalyst. The catalyst so treated was still moist with 2 percent acetic acid and 8 percent monochloroacetic acid. The oxidation by means of chlorine and the reduction to metallic palladium were effected in the manner described in Example 3. The catalyst so regenerated had an activity and selectivity approaching those of a fresh catalyst.

EXAMPLE 5

A solid bed catalyst of the same quality as that used in Examples 1 through 3, whose activity in the dehalogenation of dichloroacetic acid in the presence of monochloroacetic acid and hydrogen in gas phase had dropped to about 10 percent of its initial activity, was chlorinated in the hydrogenation reactor itself. The reactor was a heated tube 50 cm. long and 5 cm. wide. In this example, the catalyst was moistened with 1 weight percent water and/or 2 weight percent acetic acid. During the oxidation of the palladium, 1 weight percent hydrogen chloride was added to the chlorine. The reduction was effected in the manner described in Examples 1 through 4 with the use of hydrazine and hydrogen, respectively. The resulting catalysts had an activity approaching that of a fresh catalyst.

We claim:

1. A process for regenerating a catalyst for use in the hydrogenation and dechlorination of at least one member selected from the group consisting of dichloroacetic acid and trichloroacetic acid to produce monochloroacetic acid, the catalyst containing metallic palladium deposited on a silicic acid carrier, which comprises subjecting the poisoned catalyst containing moisture in the form of at least one member selected from the group consisting of water, acetic acid and monochloroacetic acid to treatment with chlorine gas in an acetic acid, monochloroacetic acid or hydrohalic acid medium, at temperatures of between 20 and 200° C., whereby the metallic palladium is oxidized to palladium chlorine; expelling residual chlorine by means of an inert gas; and successively treating the oxidized catalyst with a reducing agent selected from the group consisting of hydrogen, hydrazine hydrate, sodium boronate, hydroquinone and a mixture of alkali metal formate and formic acid to re-effect reduction of the palladium chloride to metallic palladium.

2. The process as claimed in claim 1, wherein the catalyst to be regenerated is washed with least one member selected from the group consisting of water, acetic acid and monochloroacetic acid, prior to chlorinating the said catalyst.

3. The process as claimed in claim 1, wherein the catalyst to be regenerated is partially dried so as to establish a moisture content of between 0.5 and 20 weight percent water therein, based on the weight of the moist catalyst, prior to chlorinating the said catalyst.

4. The process as claimed in claim 1, where the catalyst to be regenerated is partially dried so as to establish therein a moisture content of between 0.5 and 50 weight percent of at least one member selected from the group consisting of acetic acid and monochloroacetic acid, based on the weight of the moist catalyst, prior to chlorinating the said catalyst.

5. The process as claimed in claim 1, wherein the chlorine gas is used in combination with 1 to 50 weight percent of an acid selected from the group consisting of hydrohalic acids, acetic acid and monochloroacetic acid.

References Cited
UNITED STATES PATENTS

| | | |
|---|---|---|
| 2,671,803 | 3/1954 | Sennewald et al. ___ 260—539 A |
| 3,488,295 | 1/1970 | Sennewald et al. _____ 252—415 |
| 3,016,354 | 1/1962 | Hindin et al. _____ 252—413 |
| 3,071,615 | 1/1963 | Opitz et al. _____ 252—415 |
| 3,373,219 | 3/1968 | Kronig et al. ____ 252—466 PT |
| 2,863,917 | 12/1958 | Rucker et al. _____ 260—539 A |

DANIEL E. WYMAN, Primary Examiner

P. E. KONOPKA, Assistant Examiner

U.S. Cl. X.R.

260—539 A

UNITED STATES PATENT OFFICE

CERTIFICATE OF CORRECTION

Patent No. 3,660,306　　　　　　　　Dated May 2, 1972

Inventor(s) Sennewald et al

It is certified that error appears in the above-identified patent and that said Letters Patent are hereby corrected as shown below:

Claim 1, column 6, line 9 change "chlorine" (first occurrence) /to -- chloride --.

Claim 2, column 6, line 17 before "least" insert -- at --.

Claim 4, column 6, line 26 change "where" to -- wherein --.

Signed and sealed this 6th day of February 1973.

(SEAL)
Attest:

EDWARD M. FLETCHER, JR.　　　　　　ROBERT GOTTSCHALK
Attesting Officer　　　　　　　　　Commissioner of Patents